United States Patent [19]

Amelio et al.

[11] Patent Number: 5,165,232
[45] Date of Patent: Nov. 24, 1992

[54] DUAL CHARGE ENGINE START ACCUMULATOR

[75] Inventors: Armand F. Amelio, Bronxville, N.Y.; James J. Manzolli, Seymour, Conn.; William F. Lange, Woodbridge, Conn.; Robert C. Eisenberg, Stratford, Conn.

[73] Assignee: The United States of America as represented by the Secretary of the Army, Washington, D.C.

[21] Appl. No.: 812,091

[22] Filed: Dec. 23, 1991

[51] Int. Cl.$^5$ .............................. F16D 31/02
[52] U.S. Cl. ...................... 60/416; 60/408; 60/656; 91/5
[58] Field of Search ................ 60/400, 402, 408, 413, 60/414, 415, 416, 417, 656; 91/5, 53; 244/53 A

[56] References Cited

U.S. PATENT DOCUMENTS

| | | | |
|---|---|---|---|
| 2,446,691 | 8/1948 | Clyde et al. | 91/53 |
| 2,721,446 | 10/1955 | Bumb | 60/415 |
| 2,970,440 | 2/1961 | Dmitroff et al. | 60/415 |
| 2,981,056 | 4/1961 | Clark et al. | 60/415 |
| 3,100,965 | 8/1963 | Blackburn | 60/413 |
| 3,811,281 | 5/1974 | Wise et al. | 60/416 |

Primary Examiner—Edward K. Look
Assistant Examiner—F. Daniel Lopez
Attorney, Agent, or Firm—John H. Lamming; Arthur H. Tischer

[57] ABSTRACT

There is provided by the present invention an accumulator system for turbine engine start-ups that has comparable weight and bulk to a conventional auxiliary power unit system but which has instantaneous second start capability.

6 Claims, 2 Drawing Sheets

DUAL CHARGE ENGINE START ACCUMULATOR

BACKGROUND OF THE INVENTION

This invention relates to engine start systems, and, more particularly, to a new and useful dual charge accumulator system for starting gas turbine engines.

An auxiliary power unit (APU) is a gas turbine engine that can supply rotary power to driving a generator and that supplies compressed air power for starting the main gas turbine engine(s) of a helicopter. In the present state of the art pertaining to rotary wing aircraft, helicopter engines are started with APUs or accumulators. The latter provide pressurized fluid instead of gas to perform work. Alternatively, the APU may in turn be started with an accumulator that supplies pressurized fluid to turn the compressor rotors of the APU in starting. Noncompressible hydraulic fluids are used in these accumulators.

Accumulators typically use a stored charge of compressed gas to propel their hydraulic fluid with sufficient force to perform useful work. Once the hydraulic fluid has been expelled and the compressed gas has been expanded, an accumulator must be recharged before it can be used again. Recharging is accomplished by gathering the hydraulic fluid under pressure and then compressing gas to a pressure equal to that of the gathered hydraulic fluid.

Although accumulators are capable of starting the main engines of a helicopter, it is usually more efficient and advantageous to use an APU for starting the main engines and an accumulator for starting the APU. To start the main engines of a helicopter, an accumulator would require approximately five gallons of hydraulic fluid. For the second start, or a failed start, recharging the accumulator by pumping the expelled fluid back into its reservoir under pressure and compressing a gas charge would require several hours of work using standard size manual or electric pumps. While heavier equipment might be used to reduce the time required for recharging on accumulator, the added weight against the time saved can cause the cost/benefit balance to tip in favor of standard equipment and longer recharging time. In either case, the situation is unfavorable.

Since an APU is much smaller than a main engine and requires for less power for start-up, the accumulator used to start the APU will require only about one gallon of fluid instead of the five typically needed for a main engine start-up. Smaller standard pumps for recharging the fluid and gas under pressure are therefore feasible.

For starting aircraft engines the capability of two start attempts provides a second starting opportunity in the event the first one fails. It is desirable that the attempts to made in rapid succession, to avoid wasting time between attempts while the aircraft may not be utilized and especially when one of the engines is idling and burning fuel to no useful purpose. One means of satisfying this requirement is to have two separate accumulators available. The alternative is to recharge a single accumulator and make a second or subsequent start-up attempt on the recharge. Neither alternative provides a clearly favorable cost/benefit balance. A requirement to carry, service and maintain a second accumulator would clearly be detrimental. Taking the time to recharge a typical accumulator of the prior art having only one start capability imposes obvious inefficiencies on the process of starting the engines of a helicopter. A favorable alternative to this problem is presented by this invention.

The present invention provides an accumulator system for turbine engine start-ups which is comparable is size and weight to an APU start system, and which provides instantaneous second start capability.

SUMMARY AND OBJECT OF THE INVENTION

This invention provides a dual charge accumulator system for starting turbine engines. The accumulator provides a pressure vessel closed at both ends, an auxiliary pressure chamber for compressible fluid, and a movable piston. By use of sequential valving, instantaneous second start capability is provided. The accumulator must be serviced after each second start attempt. The accumulator requires no servicing if the first start attempt is successful.

It is an object of the present invention to provide an accumulator system which is capable of providing two turbine engine start-up attempts without necessity of servicing the accumulator between attempts.

It is a further object of the invention to provide an accumulator system having weight and bulk characteristics comparable to an APU start system while additionally having instantaneous second start capability.

DESCRIPTION OF THE PREFERRED EMBODIMENT

The dual charge accumulator of the present invention has the following general configuration, in comparison with typical one-charge systems. One-half of the accumulator pressure vessel resembles a conventional self-displacing accumulator vessel. The other half of the vessel, which is a conventional system is vented to the atmosphere, is sealed, and further, is connected by valving means to a second pressurized chamber. Additional valving means in the system of the invention permit reversal of forces and use of the second pressure chamber to provide for instantaneous second engine start capability. The elements of both conventional system and the novel system of this invention will be described in detail below. A used herein the term "compressible fluid" applies to any fluid medium which may be raised to elevated pressure under compressive force, and preferably refers to media in the gas phase. Fluid lines are those lines which are capable of transmitting a compressible fluid through space and incorporating valve means to effectuate reversal of flow and of force when desired. "Hydraulic fluid" as used herein is interchangeable with "noncompressible fluid" and is understood to be any fluid that withstands compressive force, and is preferably in the liquid phase.

Figure 1:
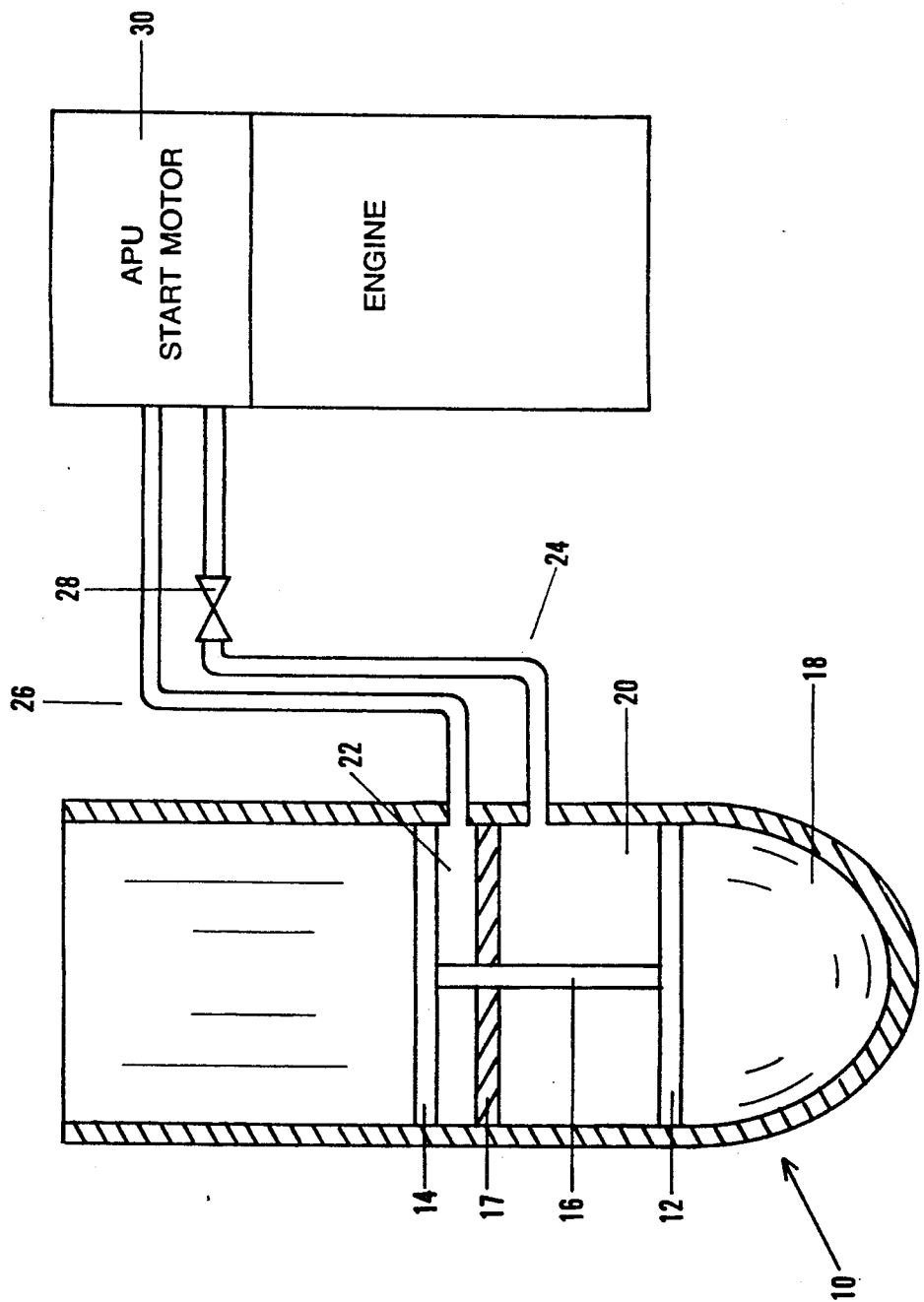
FIG. 1 is a schematic diagram of a conventional accumulator starting system of the prior art.

Presenting, helicopter engines are started with APUs, which are turboshaft engines typically providing about one-tenth (1/10) the power output of the main aircraft engines. An APU is typically started with an accumulator system; the accumulator provides the force of pressurized hydraulic fluid to turn the APU compressor rotors in the starting operation. Referring to FIG. 1, a conventional accumulator system comprises a pressure vessel 10 having cylindrical inside walls and closed at one end. A floating piston with heads 12 and 14 connected by a shaft 16 move slidably within a cylindrical portion of the interior wall on the inside of the pressure vessel 10. The piston heads 12 and 14 are round or circular in shape to conform to the shape of the interior wall of the vessel 10; the heads fit snugly against the interior walls to allow for slideable movement while sealing the juncture of the heads and the interior cylinder wall against fluid or gas leakage. Optionally, rings may be used on the piston heads to help with the sealing. An internal wall structure segment 17 is placed within the pressure vessel so that it is orthogonal to the cylindrical portion of the interior walls. It is mounted in place within the pressure vessel 10; the piston head connecting shaft 16 moves slidably within an aperture in the wall segment 17 that conforms to the shape of the shaft and also seals against liquid and gas leakage. The internal wall segment 17 divides the cylinder into three discrete chambers, 18, 20 and 22. Chamber 18 is filled with inert gas compressed to high pressure; chamber 20 is filled with an incompressible fluid. Chamber 22 serves as a reservoir for accepting the incompressible fluid of chamber 20 upon expansion of the gas in chamber 18 and the consequent movement of the piston head 12 from its indicated rest position. The other piston head 14 is open to the atmosphere under standard ambient conditions and is therefore permitted axial motion with minimal resistance. Hydraulic lines 24 and 26 are in fluid communication with chambers 20 and 22 and an actuator valve 28 is provided to initiate engine start-up. When valve 28 is opened, the gas in chamber 18 expands and axially strokes the floating pistons 12 and 14 thereby passing the incompressible fluid through the APU start motor 30 and transferring the fluid from chamber 20 to chamber 22.

Typically, about one gallon of fluid is all that a conventional accumulator must house for engine start-ups, because the APU is far smaller than a conventional engine. A small hydraulic pump (not shown) is employed to shuttle the fluid back into chamber 20, repressurizing the gas in chamber 18. This servicing process prepares the accumulator for another start-up attempt.

Figure 2:
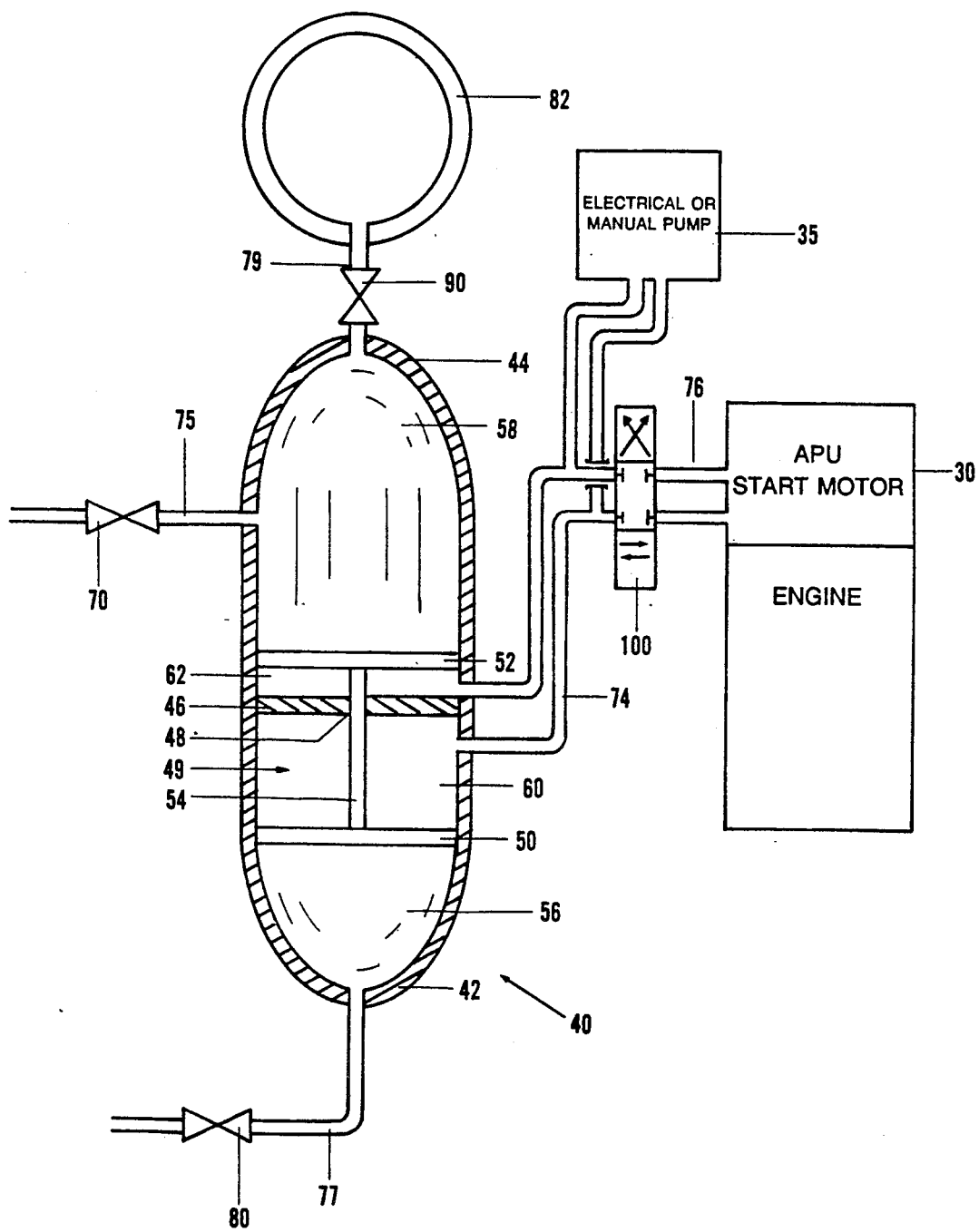
FIG. 2 is a schematic diagram of the accumulator starting system of the present invention.

FIG. 2 is a schematic diagram of a dual charge accumulator starting system for turbine engines of the present invention. Turning now to FIG. 2, the elements comprising the preferred embodiment of the invention may be set forth in detail. This accumulator has a pressure vessel 40 including closed end portions 42 and 4. An internal wall segment structure 46 is medially placed inside the pressure vessel 40 and affixed orthogonally to the cylindrical inner walls of said pressure vessel in a manner that seals the juncture against leakage of liquid. The internal wall segment 46 has an aperture 48 therein. A floating piston 49 having first and second piston head members 50 and 52, respectively, are horizontally opposed to each other and located on opposite sides of the internal wall segment; they are relatively fixed in position by a piston rod member 54 connected to both piston heads 50 and 52. The rod member 54 extends through and is sealed along the aperture 48, and is permitted to move slidably along the aperture while maintaining its fit and seal therein. The opposed piston heads 50 and 52 move slidably along the inner cylindrical walls of the pressure vessel 40 and have a circular shape to conform to the shape of the inner wall. The piston heads are sealed at their juncture at their juncture with the inside cylindrical walls in a manner that permits their slidable movement within the pressure vessel while maintaining a tight seal against gas or fluid leakage.

The two piston heads 50 and 52 and the internal wall segment 46 depicted in FIG. 2 create four discrete chambers within the interior of the pressure vessel 40. The chambers are designated as first and second end chambers, 56 and 58 respectively; and first and second medial chambers, 60 and 62, respectively. The first end chamber 56 is filled with a compressible fluid. The medial chamber 60 and 62 are filled with an incompressible fluid. To charge the accumulator and prepare it for use, the fluid in the first end chamber 56 is compressed under pressure. An auxiliary pressure chamber 82 is also filled with a pressurized compressible fluid. The APU 30 is in fluid communication with the pressure vessel 40 by means of hydraulic lines 74 and 76.

There are four valve means in the accumulator system of this invention. Turning again to FIG. 2, these will now be described in detail with regard to their placement and function in the system. First valve means 70 is in fluid communication with the second end chamber 58 at one end and open to the atmosphere at the other end by means of a fluid line 75. The opening to the atmosphere permits unrestricted movement of the floating piston 49 when first valve means 70 is in an open position. Closing valve means 70 seals the second end chamber 58. The first valve means 70 will be open during a first engine start attempt and will be closed during a second engine start attempt.

Second valve means 80 is in fluid communication with the first end chamber 56 at one end and is open to the atmosphere at the other end, by means of fluid line 77. Opening to the atmosphere permits unrestricted movement of floating piston 49 when the valve 80 is open; by closing this valve the first end chamber 56 is sealed. The second valve means 80 will be closed during a first engine start attempt and will be open during a second engine start attempt.

Third valve means 90 is in fluid communication with the auxiliary pressure chamber 82 at one end with the second end chamber 58 at the other end by means of fluid line 79. The pressure in the auxiliary chamber 82 is used for pressurizing the second end chamber during a second engine start attempt. When valve means 90 is opened the auxiliary pressure chamber 82 will partially discharge filling second end chamber 58. When the start valve means 100 (see below) is opened, fluid will flow from second medial chamber 62 causing the piston to move and expanding second end chamber 58. As end chamber 58 expands, auxiliary pressure chamber 82 will continue to discharge.

The fourth valve means 100 (the engine start valve means), by hydraulic lines 76 and 76 respectively, is in fluid communication with the first and second medial chambers 60 and 62 and the APU start motor 30. The expansion of pressurized compressible fluid initiates fluid flow from one medial chamber to the other during first and second start attempts.

When the engine start cycle is initiated first and chamber 56 and auxiliary chamber 82 are fully charged (i.e., filled with compressible fluid under pressure); second end chamber 58 is vented to the atmosphere (i.e., the valve means 70 is in open position); and the piston 49 is positioned so that the first medial chamber 60 is full of hydraulic fluids and the second medial chamber 62 is evacuated. The engine cycle begins when the engine start valve 100 is shuttled. The compressible fluid pressure acting on the piston 49 forces hydraulic fluid from first medial chamber 60 to turn the APU compressor turbines. At the same time, second medial chamber 62 is filling up with return fluid, and air in second end chamber 58 is escaping to the atmosphere. At the end of the first engine start cycle second medial chamber 62 is full of hydraulic fluid, first medial chamber 60 is evacuated, and second end chamber 58 is reduced to very small volume by the movement of the floating piston 490 and its change of position during the first start cycle. Prior to initiating the second start cycle the first valve means 70 is shuttled to seal off second end chamber 58 from the atmosphere; second valve means 80 is shuttled to the open position, thus opening first end chamber 56 to the atmosphere; third valve means 90 is shuttled to the open position connecting auxiliary chamber 82 to the second end chamber 58. At this point, engine start valve means 100 can be shuttled to the open position causing the auxiliary chamber 82 to discharge. The accumulator functions in the same manner as described for the first start attempt except that the floating piston 49 moves in the opposite direction and the hydraulic fluid flows from the second medial chamber 62 through the APU compressor and into the first medial chamber 60. When the first end chamber 56 is vented (during the second start cycle) the accumulator is not functional again until it is reserviced. After the second start attempt, the accumulator is in the same status as a conventional one charge accumulator system in that the auxiliary chamber 82 must be recharged by putting compressible fluid therein under pressure to energize the system for another cycle of engine start-up attempts. Electrical or manual pump means 35 may be connected to hydraulic lines 74 and 76 to transfer the hydraulic fluid from one medial chamber to another with valve means shuttled to proper settings to recharge the compressible fluid into auxiliary chamber 82.

The present invention therefore permits the floating piston 49 to shuttle back and forth during first and second engine start attempts by sequential valving. During the first start attempt the second end chamber 58 is open to the atmosphere, analogously to the operation of a typical one charge accumulators. During the second start attempt all valves are activated to reverse the stroke of the floating piston 49 and correct the flow of hydraulic pressure to the APU start motor 30. Accordingly, the accumulator system of the present invention requires only one accumulator pressure vessel yet provides instantaneous second start capability. Like the prior art accumulator, the system pump shuttles fluid from the low pressure side to the high pressure side. The servicing process prepares the accumulator for another start attempt.

Although the structure and operation of a dual charge accumulator engine starting system has been described in terms of specific concrete details, it is clearly understood that these details were set forth to illustrate the configuration and operation of the invention and not to limit the permissible scope thereof in any manner. Therefore, changes and modifications may be made to the invention by those skilled in the art without departing in any significant way from the spirit and scope of the invention.

What is claimed is:

1. A dual charge accumulator system for starting gas turbine engines, comprising:
   (a) a pressure vessel having a segment of cylindrical shape and tapered closed ends including an inner wall section in which the inner surface has a cylindrical shape and a separate auxiliary chamber containing one outlet for a compressible fluid line;
   (b) an internal wall segment structure having an aperture therein, medially placed inside the pressure vessel and affixed orthogonally to the cylindrical inner walls of said pressure vessel in a manner that seal the juncture of the internal wall segment and the inner walls of the pressure vessel against leakage of liquid;
   (c) floating piston means capable of slidable movement inside the pressure vessel comprising two opposed piston head placed on opposite sides of the internal wall segment, and a piston rod located within the aperture of the internal wall segment connecting the two piston heads, wherein the piston heads form a seal where they touch the inner surface of the pressure vessel and the piston rod forms a seal where it touches the aperture in the internal wall segment, the seals thus formed being capable of preventing leakage by gas or liquid media;
   (d) four discrete chambers of variable volume circumscribed by the medial internal wall segment and the opposed heads of said piston means, including two medial chambers for hydraulic fluid and two end chambers for compressible fluid;
   (e) first, second and third valve means for controlling the flow of compressible fluids;
   (f) three fluid lines, each fluid line connected at one end to an outlet in the pressure vessel, connected to one of the compressible fluid end chambers, with said first and second fluid lines vented to the atmosphere, and with the third fluid line connected at its other end to the auxiliary chamber for compressible fluid, and said first, second and third valve means are incorporated in said first, second and third fluid lines, respectively, for controlling the flow of compressible fluids;
   (g) a fourth valve means for controlling the flow of hydraulic fluid;
   (h) two hydraulic lines, each connected to a different medial chamber at one end and to said fourth valve means at the other; and
   (i) pump means for transferring hydraulic fluid from one medial chamber to another with sufficient force to compress a quantity of compressible fluid under elevated pressure.

2. The dual charge accumulator system of claim 1 wherein the floating piston means further comprise ring means lodged in each opposed piston head to form a seal between the piston heads and the inner surface of the pressure vessel to prevent leakage of either liquid or gas media through the seal.

3. The dual charge accumulator of claim 1 wherein the pump means for transferring hydraulic fluid between medial chambers is electrical.

4. The dual charge accumulator of claim 1 wherein the pump means for transferring hydraulic fluid between medial chambers is manual.

5. The dual charge accumulator of claim 2 wherein the pump means for transferring hydraulic fluid between medial chambers is electrical.

6. The dual charge accumulator of claim 2 wherein the pump means for transferring hydraulic fluid between medial chambers is manual.

* * * * *

UNITED STATES PATENT AND TRADEMARK OFFICE
CERTIFICATE OF CORRECTION

PATENT NO. : 5,165,232

DATED : November 24, 1992

INVENTOR(S) : Armand F. Amelio, et al.

It is certified that error appears in the above—identified patent and that said Letters Patent is hereby corrected as shown below:

In Column 1, Line 9, delete "to" and insert therefor --for--.

In Column 1, Line 42, delete "on" and insert therefor --an--.

In Column 1, Line 47, delete "for" and insert therefor --far--.

In Column 1, Line 55, delete first occurrence of "to" and insert therefor --be--.

In Column 2, Line 4, delete second occurrence of "is" and insert therefor --in--.

In Column 2, Line 40, delete first occurrence of "is" and insert therefor --in--.

In Column 2, Line 46, delete "system" and insert therefor --systems--.

In Column 2, Line 48, delete "A" and insert therefor --As--.

In Column 2, Line 59, delete "Presenting" and insert therefor --Presently--.

In Column 3, Line 20, delete "incompressible" and insert therefor --noncompressible--.

In Column 3, Line 21, delete "incompressible" and insert therefor --noncompressible--.

In Column 3, Line 32, delete "incompressible" and insert therefor --noncompressible--.

In Column 3, Line 48, delete "4" and insert therefor --44--.

In Column 3, Line 66, delete redundant occurrence of "at their juncture".

In Column 4, Line 10, delete "chamber" and insert therefor --chambers--.

UNITED STATES PATENT AND TRADEMARK OFFICE
CERTIFICATE OF CORRECTION

PATENT NO. : 5,165,232
DATED : November 24, 1992
INVENTOR(S) : Armand F. Amelio, et al.

It is certified that error appears in the above—identified patent and that said Letters Patent is hereby corrected as shown below:

In Column 4, Line 10, delete "incompressible" and insert therefor --noncompressible--.

In Column 4, Line 53, delete the first occurrence of "76" and insert therefor --74--.

In Column 5, Line 8, delete "490" and insert therefor --49--.

In Column 6, Line 8, delete "seal" and insert therefor --seals--.

In Column 6, Line 13, delete "head" and insert therefor --heads--.

Signed and Sealed this

Fifth Day of October, 1993

Attest:

BRUCE LEHMAN

Attesting Officer

Commissioner of Patents and Trademarks